US012562424B2

(12) United States Patent
Jang et al.

(10) Patent No.: US 12,562,424 B2
(45) Date of Patent: Feb. 24, 2026

(54) BATTERY PACK CASE INCLUDING OVER-FUSION PREVENTION STRUCTURE

(71) Applicant: LG ENERGY SOLUTION, LTD., Seoul (KR)

(72) Inventors: Jae Young Jang, Daejeon (KR); Jin Hyun Lee, Daejeon (KR); Sang Jin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 819 days.

(21) Appl. No.: 17/915,851

(22) PCT Filed: Nov. 19, 2021

(86) PCT No.: PCT/KR2021/017118
§ 371 (c)(1),
(2) Date: Sep. 29, 2022

(87) PCT Pub. No.: WO2022/108398
PCT Pub. Date: May 27, 2022

(65) Prior Publication Data
US 2023/0155225 A1      May 18, 2023

(30) Foreign Application Priority Data

Nov. 23, 2020      (KR) ........................ 10-2020-0157624

(51) Int. Cl.
H01M 50/204 (2021.01)
B29C 65/08 (2006.01)
(Continued)

(52) U.S. Cl.
CPC ........... H01M 50/204 (2021.01); B29C 65/08 (2013.01); B29C 65/56 (2013.01); B29L 2031/7146 (2013.01)

(58) Field of Classification Search
CPC . B29C 65/08; B29C 65/56; B29L 2031/7146; H01M 50/204; H01M 50/207; H01M 50/20; Y02E 60/10
See application file for complete search history.

(56) References Cited

U.S. PATENT DOCUMENTS

2003/0146734 A1      8/2003   Kozu et al.
2012/0135300 A1      5/2012   Ota
(Continued)

FOREIGN PATENT DOCUMENTS

CN            103682181 A        3/2014
CN            111868960 A        10/2020
(Continued)

OTHER PUBLICATIONS

English Translation of JP2019021454.*
(Continued)

*Primary Examiner* — Kiran Quraishi Akhtar
(74) *Attorney, Agent, or Firm* — Birch, Stewart, Kolasch & Birch, LLP

(57)        ABSTRACT

Discussed is a battery pack case configured to receive a plurality of battery cells, the battery pack case including a first case and a second case coupled to each other through and engagement between first case and the second case. A projecting portion is on a coupling portion of the first case at a middle part of the first case in a thickness direction to project therefrom, a grooved portion is in a coupling portion of the second case at a middle part of the second case in a thickness direction thereof such that the projecting portion is inserted into the grooved portion, and a uniform gap between the outside of the projecting portion of the first case and the outside of the grooved portion of the second case in the state in which the first case and the second case are coupled and thermally fused to each other.

8 Claims, 5 Drawing Sheets

(51) Int. Cl.
　　B29C 65/56 　　(2006.01)
　　B29L 31/00 　　(2006.01)

(56) References Cited

U.S. PATENT DOCUMENTS

| | | |
|---|---|---|
| 2014/0072831 A1 | 3/2014 | Wang et al. |
| 2019/0375164 A1 | 12/2019 | Sakurada et al. |
| 2021/0242526 A1 | 8/2021 | Jang et al. |

FOREIGN PATENT DOCUMENTS

| | | | |
|---|---|---|---|
| JP | 2001-313014 A | 11/2001 | |
| JP | 2002-245993 A | 8/2002 | |
| JP | 2008-78967 A | 4/2008 | |
| JP | 4269638 B2 | 5/2009 | |
| JP | 2009-181830 A | 8/2009 | |
| JP | 2011-233461 A | 11/2011 | |
| JP | 4948004 B2 | 6/2012 | |
| JP | 2019-21454 A | 2/2019 | |
| JP | 2019021454 * | 2/2019 | ............. H01M 2/10 |
| KP | 10-2006-0034509 A | 4/2006 | |
| KR | 10-2004-0085478 A | 10/2004 | |
| KR | 10-0689574 B1 | 3/2007 | |
| KR | 10-2016-0124004 A | 10/2016 | |
| WO | WO 2011/096159 A1 | 8/2011 | |

OTHER PUBLICATIONS

Extended European Search Report for European Application No. 21895165.5, dated Sep. 1, 2023.
International Search Report (PCT/ISA/210) issued in PCT/KR2021/017118 mailed on Mar. 2, 2022.

* cited by examiner

【FIG. 1】
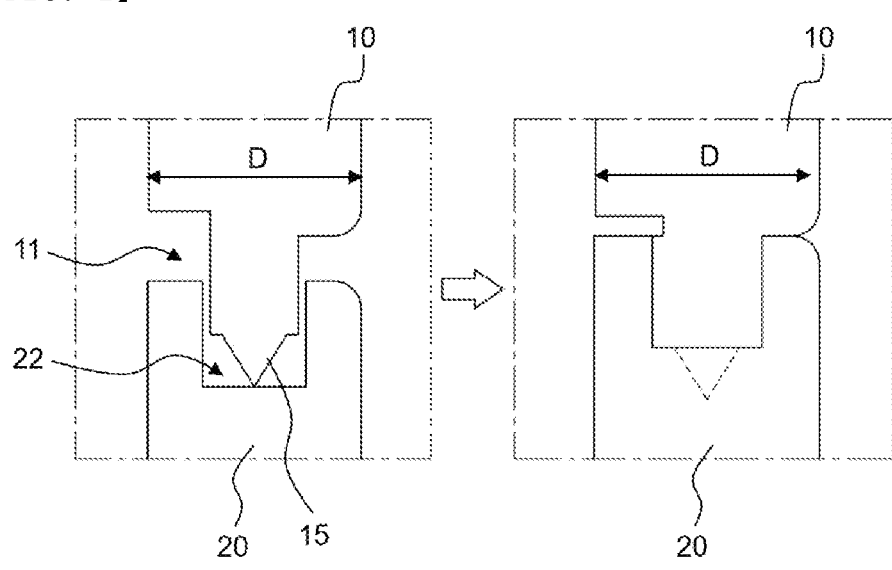
【FIG. 2】
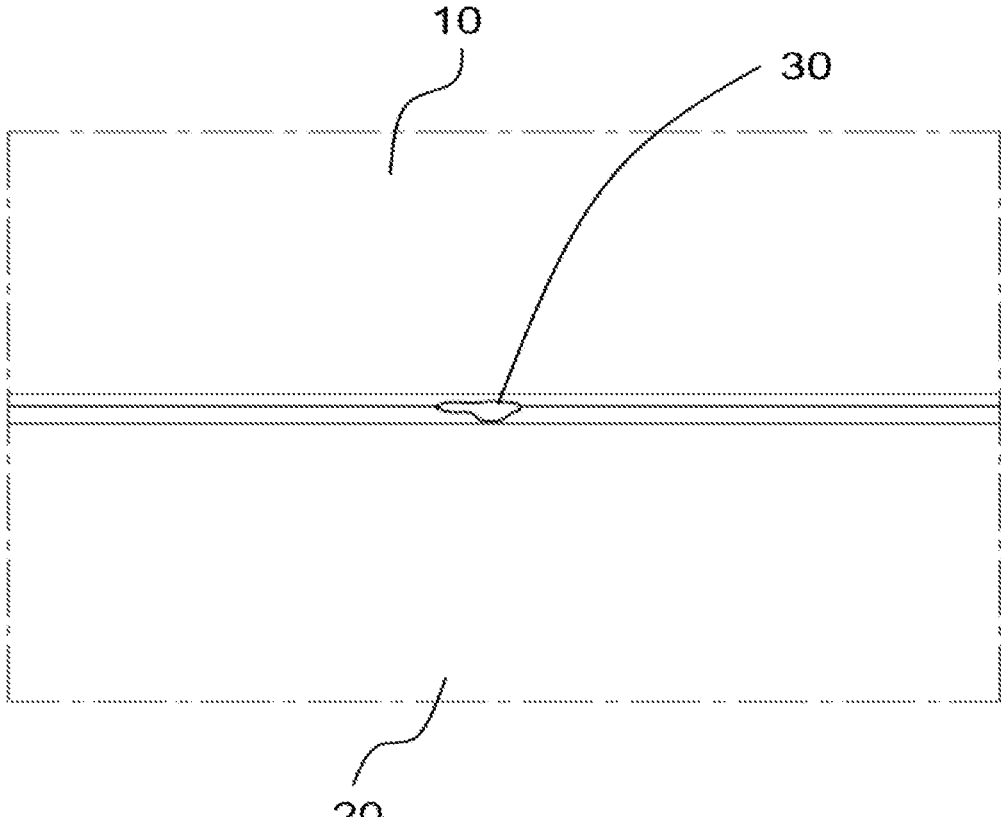

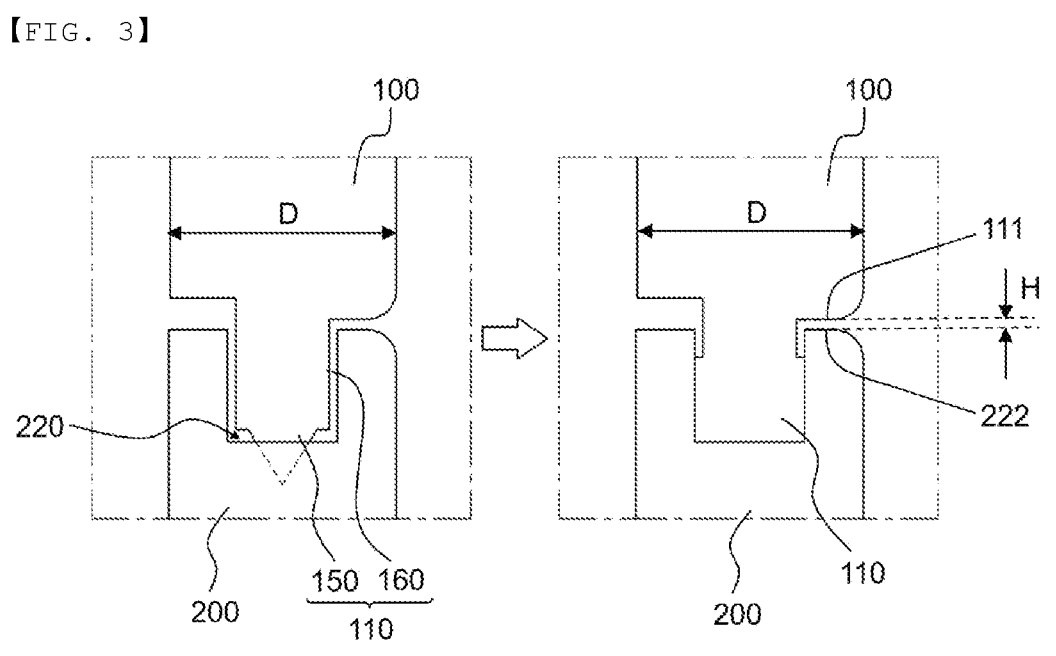

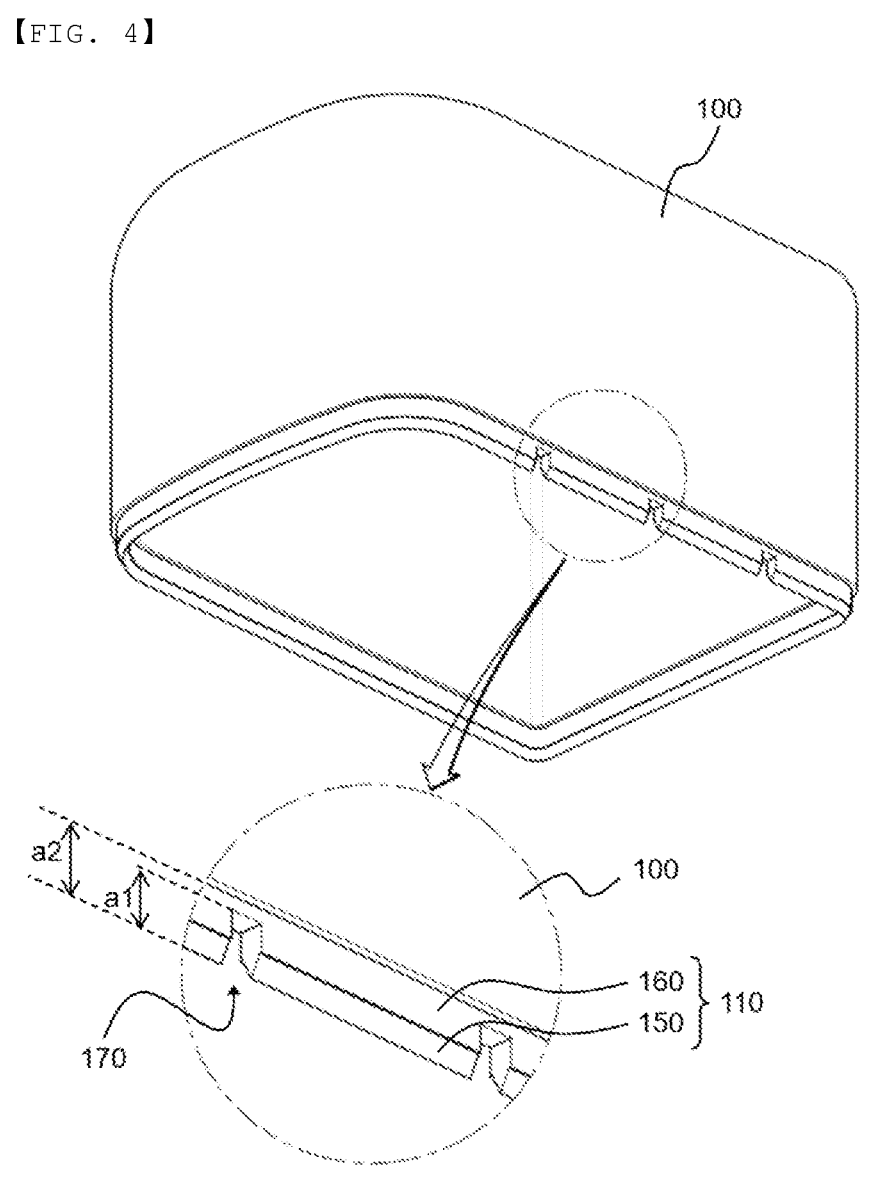

【FIG. 5】
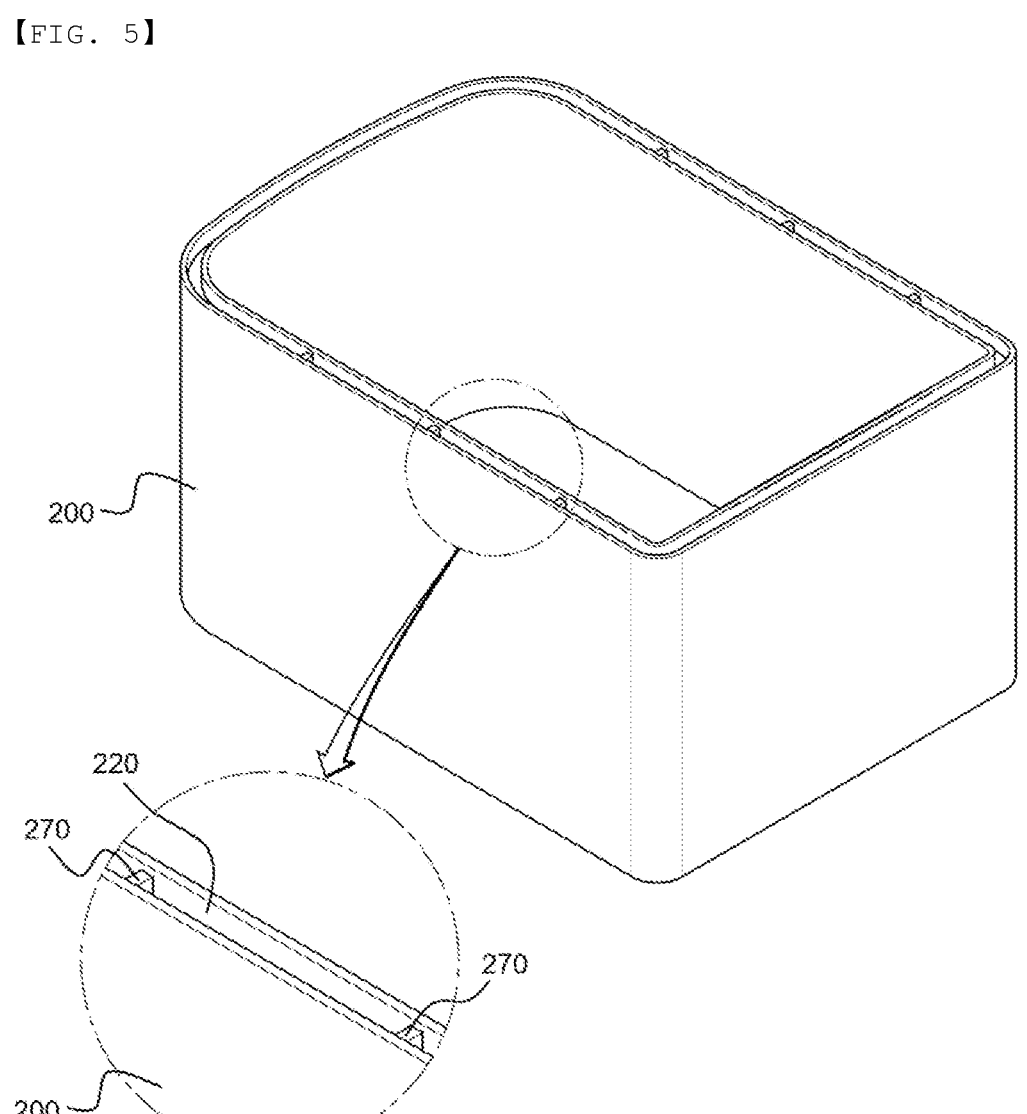

【FIG. 6】
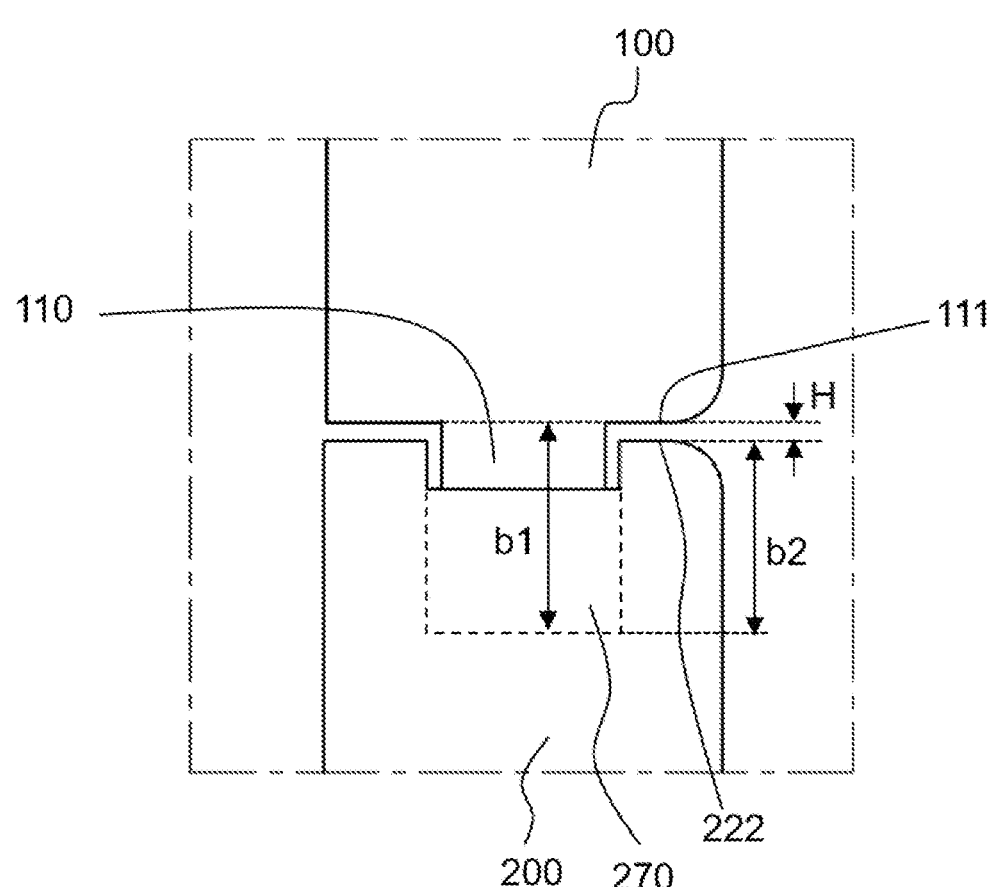

BATTERY PACK CASE INCLUDING OVER-FUSION PREVENTION STRUCTURE

TECHNICAL FIELD

This application claims the benefit of priority to Korean Patent Application No. 2020-0157624 filed on Nov. 23, 2020, the disclosure of which is incorporated herein by reference in its entirety.

The present invention relates to a battery pack case including an over-fusion prevention structure. More particularly, the present invention relates to a battery pack case including an over-fusion prevention structure capable of preventing external defects from occurring on a coupling portion of the battery pack case due to over-fusion when ultrasonic welding is performed for coupling of the battery pack case.

BACKGROUND ART

A battery pack constituted by secondary batteries connected to each other in series or in parallel is used as an energy source for medium- or large-sized devices, which require high output and high capacity. The battery pack may include a plurality of battery cells, a structure configured to perform electrical connection between the battery cells, a structure configured to control the operation of the battery cells, and a structure configured to adjusting heat generation/heat dissipation of the battery cells in a battery pack case, and coupling of the battery pack case is performed in the state in which the structures are received therein to manufacture the battery pack.

As a coupling method of a battery pack case manufactured using a polymer resin, there is used a method of pressurizing the polymer resin in a molten state using frictional heat by ultrasonic vibration in order to achieve fusion. If a joint of the battery pack case is over-fused or pressing force is inaccurately controlled, the molten resin flows outwards, whereby burrs are generated.

FIG. 1 is a vertical sectional view of a coupling portion of a conventional battery pack case, and FIG. 2 is a front view of the coupling portion of the battery pack case of FIG. 1.

Referring to FIGS. 1 and 2, the battery pack case is constituted by a first case 10 located above and a second case 20 located below. A projecting portion 11 is formed on a coupling portion of the first case 10 at a middle part of the first case in a thickness direction D thereof so as to project downwards therefrom, and a grooved portion 22 is formed in a coupling portion of the second case 20 at a middle part of the second case in a thickness direction D thereof so as to be concave. The projecting portion 11 of the first case 10 is inserted into and fixed to the grooved portion 22 of the second case 20, whereby the battery pack case is assembled.

The projecting portion 11 includes an energy director 15 formed at the end thereof such that the width of the energy director in the thickness direction D thereof is gradually decreased. When vibration is applied to the first case 10 and the second case 20, the energy director 15 is melted in the grooved portion 22 of the second case 20 while being vibrated, whereby the grooved portion 22 is filled with the projecting portion 11.

At this time, if the first case is excessively pressed toward the second case in the state in which the energy director 15 is melted, the energy director may be over-fused, whereby some of the melted energy director may flow out of the case. As a result, burrs 30 may be generated, as shown in FIG. 2.

FIG. 2 shows the state in which the burrs 30 are generated at the coupling portions of the first case 10 and the second case 20 due to over-fusion. In order to prevent generation of defects, such as burrs, it is important to maintain a uniform distance between the first case and the second case in a height direction thereof at the coupling portions of the first case and the second case.

In connection therewith, Patent Document 1 discloses a battery pack configured such that a battery pack case includes a front case and a rear case, a plurality of fusion protrusions made of a resin is formed along the edge of the rear case, i.e. the part of the rear case that contacts the front case, and outflow prevention recesses configured to prevent outflow of the fusion protrusions are formed along the edge of the front case at the region of the front case that contacts the fusion protrusions of the rear case.

However, the outflow prevention recesses of Patent Document 1 have difficulty completely preventing the fusion protrusions from flowing out of the outflow prevention recesses when the fusion protrusions are melted. That is, time and force control is necessary when the front case and the rear case are coupled to each other, and, if the fusion protrusions flow out of the outflow prevention recesses in the state in which the fusion protrusions are melted, it is difficult to prevent external defects, such as the burrs of FIG. 2, from occurring between the battery cases.

Patent Document 2 discloses a vibration fusion structure between a resin case and a resin cover capable of preventing burrs generated when the resin case and the resin cover are fused to each other using vibration from leaking out into an inner space surrounded by the resin case and the resin cover, wherein projection portions projecting from the resin case and the resin cover are fused to each other by vibration to form a joint at fused portions of the resin case and the resin cover and wherein an inner burr concealment wall, an outer burr concealment wall, and a middle burr concealment wall are formed in order to prevent melting and flowing of the projecting portions.

In Patent Document 2, when the fused portions are melted, it is possible to prevent the melted portions from flowing out of coupling portions of the resin case and the resin cover to a certain extent, since the plurality of concealment walls is formed. However, it is not possible to completely prevent burrs from flowing out of the coupling portions of the resin case and the resin cover, like Patent Document 1.

Therefore, there is a need for a battery pack case having a structure capable of fundamentally preventing generation of external defects as the result of an energy director of a battery case melted by vibration heat flowing out of the battery case.

Korean Patent Application Publication No. 2004-0085478 (2004.10.08). ("Patent Document 1")

Japanese Registered Patent Publication No. 4948004 (2012.03.16) ("Patent Document 2")

DISCLOSURE

Technical Problem

The present invention has been made in view of the above problems, and it is an object of the present invention to provide a battery pack case including an over-fusion prevention structure capable of preventing generation of burrs on a coupling portion of the battery pack case due to over-fusion of the battery pack case, thereby reducing external defects.

Technical Solution

In order to accomplish the above object, the present invention provides a battery pack case configured to receive a plurality of battery cells, the battery pack case including a first case and a second case coupled to each other through an engagement between the first case and the second case, wherein a projecting portion is on a coupling portion of the first case at a middle part of the first case in a thickness direction thereof so as to project therefrom, wherein a grooved portion is in a coupling portion of the second case at a middle part of the second case in a thickness direction thereof such that the projecting portion is inserted into the grooved portion, and wherein a uniform gap is between the outside of the projecting portion of the first case and the outside of the grooved portion of the second case in the state in which the first case and the second case are coupled and thermally fused to each other.

A support structure configured to form the gap may be in the grooved portion of the second case.

A stopper rib may be in the grooved portion of the second case as the support structure.

A stopper recess may be at the position of the projecting portion of the first case corresponding to the stopper rib.

The depth of the stopper recess may be less than the height of the projecting portion.

The depth of the stopper recess may be greater than the height of the stopper rib based on the state before the projecting portion is melted.

The projecting portion may include an energy director configured to be melted by heat and a support portion excluding the energy director.

The sum of the height of the stopper rib and the length of the projecting portion at a part of the first case at which the stopper recess is may be greater than the depth of the grooved portion of the second case in the state in which the first case and the second case are coupled and thermally fused to each other.

A gap may be present between the projecting portion and an inner surface of the grooved portion before the first case and the second case are thermally fused to each other, and the projecting portion and the grooved portion may be fused to each other in the state in which the first case and the second case are thermally fused to each other.

The support structure may be on at least one side of each of outer peripheries of the first case and the second case at which the first case and the second case are coupled to each other.

The support structure may be on the entireties of outer peripheries of the first case and the second case at which the first case and the second case are coupled to each other.

Advantageous Effects

As is apparent from the above description, in a battery pack case according to the present invention, a support structure is formed at coupling portions of a first case and a second case, whereby it is possible to maintain a uniform coupling distance between the first case and the second case even when coupling force is excessively applied to the first case and the second case in the state in which a projecting portion of the first case is melted.

Since the coupling distance between the first case and the second case is maintained uniform, as described above, it is possible to prevent generation of burrs due to over-fusion at the coupling portions of the first case and the second case, whereby it is possible to reduce an external defect rate.

DESCRIPTION OF DRAWINGS

FIG. 1 is a vertical sectional view of a coupling portion of a conventional battery pack case.

FIG. 2 is a front view of the coupling portion of the battery pack case of FIG. 1.

FIG. 3 is a vertical sectional view of coupling portions of a first case and a second case according to the present invention.

FIG. 4 is a perspective view of the first case according to the present invention.

FIG. 5 is a perspective view of the second case according to the present invention.

FIG. 6 is a vertical sectional view showing the state in which the first case and the second case are fused to each other.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

An embodiment of the present invention will be described in detail with reference to the accompanying drawings.

A battery pack case according to the present invention includes a first case and a second case, which are separated from each other. The first case and the second case have a structure in which the first case and the second case are coupled to each other through engagement therebetween.

Specifically, a projecting portion is formed on a coupling portion of the first case at a middle part of the first case in a thickness direction thereof so as to project therefrom, and a grooved portion is formed in a coupling portion of the second case at a middle part of the second case in a thickness direction thereof such that the projecting portion is inserted into the grooved portion. Consequently, the projecting portion may be inserted into the grooved portion, whereby engagement therewith may be achieved.

In connection therewith, FIG. 3 is a vertical sectional view of coupling portions of a first case and a second case according to the present invention.

Referring to FIG. 3, FIG. 3(a) shows the state in which ultrasonic welding is being performed in the state in which the first case 100 and the second case 200 are coupled to each other, and FIG. 3(b) shows the state in which ultrasonic welding has been completed.

The battery pack case includes the first case 100 and the second case 200. A projecting portion 110 is formed on a coupling portion of the first case 100 at a middle part of the first case 100 in a thickness direction D thereof so as to project downwards therefrom, and a grooved portion 220 is formed in a coupling portion of the second case 200 at a middle part of the second case 200 in a thickness direction D thereof such that the projecting portion 110 is inserted into the grooved portion. The projecting portion 110 is inserted into the grooved portion 220, whereby the first case and the second case are primarily coupled to each other.

When ultrasonic vibration is applied to the first case 100 and the second case 200 in this state, frictional heat is generated at the interface between the projecting portion 110 of the first case 100 and the grooved portion 220 of the second case 200, whereby the end of the projecting portion 110 is melted. That is, the projecting portion 110 includes an energy director 150 configured to be melted by heat and a support portion 160 excluding the energy director 150.

A separation space is present between the projecting portion 110 and the inner surface of the grooved portion 220 before the first case 100 and the second case 200 are thermally fused to each other. FIG. 3(a) shows the state in which ultrasonic welding is being performed, wherein half or more of the energy director 150 is melted. When the first case 100 and the second case 200 are pressed so as to be closer to each other while the energy director 150 is melted, the separation space between the projecting portion 110 and the inner surface of the grooved portion 220 is fully filled with the melted energy director.

The grooved portion 220 of the second case 200 is configured to have a structure in which opposite sides of a concave groove project. When ultrasonic welding is performed in the state in which the projecting portion 110 is inserted into the grooved portion 220, therefore, it is possible to prevent bending of the projecting portion and to maintain the projecting shape of the projecting portion in the grooved portion 220.

Also, even in the state in which the energy director 150 is melted by ultrasonic welding, a uniform gap H is formed between the outside 111 of the projecting portion 110 of the first case and the outside 222 of the grooved portion 220 of the second case, since a support structure is formed at the first case 100 and the second case 200 according to the present invention, as shown in FIGS. 4 and 5.

As described above, the gap H is formed between the outside 111 of the projecting portion of the first case and the outside 222 of the grooved portion of the second case, as the coupling portions of the first case and the second case, along the entire outer peripheries thereof, whereby it is possible to solve a conventional problem in that burrs are generated on the coupling portions due to over-fusion of the battery case. Consequently, it is possible to remarkably reduce external defects.

FIG. 4 is a perspective view of the first case according to the present invention, and FIG. 5 is a perspective view of the second case according to the present invention.

Referring to FIGS. 4 and 5, a support structure is formed at the outer periphery of one open surface of the first case 100 and the outer periphery of one open surface of the second case 200 in order to form the gap H of FIG. 3.

Specifically, the projecting portion 110 of the first case 100 includes an energy director 150 and a support portion 160, and a stopper recess 170 is formed in the projecting portion 110.

A stopper rib 270, which is a support structure configured to maintain the gap H between the first case 100 and the second case 200, is formed in the grooved portion 220 of the second case 200. The stopper rib 270 is formed in the grooved portion 220 so as to project upwards, and performs a function of preventing the projecting portion of the first case 100 from being deeply coupled to the grooved portion even when the projecting portion is excessively melted.

In consideration of the fact that ultrasonic welding must be performed in the state in which the projecting portion 110 is deeply inserted into the grooved portion 220 to a certain extent in order to achieve stable fusion, however, it is preferable for the stopper recess 170 to be formed at the position of the projecting portion 110 corresponding to the stopper rib 270 such that the stopper rib 270 is mounted in the stopper recess 170.

Also, in consideration of the fact that the energy director 150 is melted and the grooved portion 220 is filled with the melted energy director 150 in the state in which the stopper rib 270 is mounted in the stopper recess 170 in order to achieve sealing of the battery pack, the support portion 160 must be provided at the part at which the stopper recess 170 is formed in order to completely seal the battery pack. Consequently, it is preferable for the depth a1 of the stopper recess to be less than the height a2 of the projecting portion.

Meanwhile, the energy director is melted such that the height of the energy director is reduced or removed in the state in which the stopper rib 270, which is formed so as to project, is disposed in the stopper recess 170. At this time, the stopper rib must be deeply inserted into the innermost side of the stopper recess in order to stably fix the first case and the second case to each other. Consequently, the depth of the stopper recess 170 may be greater than the height of the stopper rib 270 based on the state before the energy director is melted.

FIG. 6 is a vertical sectional view showing the state in which the first case and the second case are fused to each other.

Referring to FIG. 6, the sum b1 of the height of the stopper rib 270 and the length of the projecting portion 110 at the part thereof at which the stopper recess is formed is greater than the depth b2 of the grooved portion of the second case 200 in the state in which the first case 100 and the second case 200 are coupled and thermally fused to each other. That is, in the state in which the first case and the second case are coupled and thermally fused to each other, the lower end of the support portion may be coupled to the stopper rib in contact therewith, and the sum of the height of the support portion and the height of the stopper rib may be greater than the depth b2 of the grooved portion of the second case.

The reason for this is that the support structure is formed at the first case and the second case such that a uniform gap H is formed between the outside 111 of the projecting portion of the first case and the outside 222 of the grooved portion of the second case in the state in which the first case and the second case are coupled and thermally fused to each other.

In a concrete example, the support structure may be constituted by a pair of a stopper recess and a stopper rib, and the support structure may be formed on at least one side of each of the outer peripheries of the first case and the second case at which the first case and the second case are coupled to each other. That is, one or more pairs of stopper recesses and stopper ribs may be formed on the one side of each of the outer peripheries.

Alternatively, the support structure may be formed on the entire outer peripheries of the first case and the second case at which the first case and the second case are coupled to each other. That is, one or more support structures, each of which is constituted by a pair of a stopper recess and a stopper rib, may be formed on one side of each of the outer peripheries, and a plurality of support structures may be disposed at the entire outer peripheries. The support structures may be disposed so as to be spaced apart from each other by a predetermined distance, or may be disposed only on the straight outer periphery portions excluding corners of the outer peripheries.

As described above, the battery pack case according to the present invention includes a support structure configured to prevent over-fusion between the first case and the second case as the result of excessively close coupling therebetween when the first case and the second case are thermally fused to each other in a state of being coupled to each other. The stopper recess of the first case is caught by the stopper rib of the second case by the provision of the support structure, whereby the first case is prevented from being further inserted into the grooved portion of the second case. Consequently, it is possible to prevent a melted battery case resin from flowing out over the side walls of the grooved portion, and therefore it is possible to prevent external defects at the coupling portion of the battery pack case.

Additionally, the battery pack case according to the present invention may be a case for battery packs that are used as energy sources for various kinds of devices, wherein a through-hole, through which electrode terminals of battery cells received in the battery pack case are withdrawn outwards, may be formed in the battery pack case.

Alternatively, a structure configured to stably mount the battery pack case in various kinds of devices, such as a hook structure, may be added to the battery pack case according to the present invention.

Those skilled in the art to which the present invention pertains will appreciate that various applications and modifications are possible within the category of the present invention based on the above description.

DESCRIPTION OF REFERENCE SYMBOLS

10, 100: First cases
11, 110: Projecting portions
15, 150: Energy directors
20, 200: Second cases
22, 220: Grooved portions
30: Burrs

111: Outside of projecting portion
160: Support portion
170: Stopper recess
222: Outside of grooved portion
270: Stopper rib
a1: Depth of stopper recess
a2: Height of projecting portion
b1: Sum of height of stopper rib and length of projecting portion at part at which stopper recess is formed
b2: Depth of grooved portion
D: Thickness direction
H: Gap

INDUSTRIAL APPLICABILITY

The present invention relates to a battery pack case configured to receive a plurality of battery cells, the battery pack case including a first case and a second case coupled to each other through engagement therebetween, wherein a projecting portion is formed on a coupling portion of the first case at a middle part of the first case in a thickness direction thereof so as to project therefrom, a grooved portion is formed in a coupling portion of the second case at a middle part of the second case in a thickness direction thereof such that the projecting portion is inserted into the grooved portion, and a uniform gap is formed between the outside of the projecting portion of the first case and the outside of the grooved portion of the second case in the state in which the first case and the second case are coupled and thermally fused to each other, whereby the melted projecting portion is prevented from flowing out over the outside of the projecting portion of the first case and the outside of the grooved portion of the second case during ultrasonic welding, and therefore the present invention has industrial applicability.

The invention claimed is:

1. A battery pack case configured to receive a plurality of battery cells, the battery pack case comprising:

a first case and a second case coupled to each other through an engagement between the first case and the second case, wherein a projecting portion is on a coupling portion of the first case at a middle part of the first case in a thickness direction thereof so as to project therefrom, wherein a grooved portion is in a coupling portion of the second case at a middle part of the second case in a thickness direction thereof such that the projecting portion is inserted into the grooved portion, and wherein a uniform gap is between an outside of the projecting portion of the first case and an outside of the grooved portion of the second case in a state in which the first case and the second case are coupled and thermally fused to each other, wherein a support structure configured to form the gap is formed in the grooved portion of the second case, wherein a stopper rib is formed in the grooved portion of the second case as the support structure, and wherein a sum of a height of the stopper rib and a length of the projecting portion at a part the first case at which the stopper recess is formed is greater than a depth of the grooved portion of the second case in a state in which the first case and the second case are coupled and thermally fused to each other.

2. The battery pack case according to claim 1, wherein the stopper recess is formed at a position of the projecting portion of the first case corresponding to the stopper rib.

3. The battery pack case according to claim 2, wherein a depth of the stopper recess is less than a height of the projecting portion.

4. The battery pack case according to claim 2, wherein a depth of the stopper recess is greater than the height of the stopper rib based on a state before the projecting portion is melted.

5. The battery pack case according to claim 1, wherein the projecting portion comprises an energy director configured to be melted by heat and a support portion excluding the energy director.

6. The battery pack case according to claim 1, wherein a gap is present between the projecting portion and an inner surface of the grooved portion before the first case and the second case are thermally fused to each other, and wherein the projecting portion and the grooved portion are fused to each other in a state in which the first case and the second case are thermally fused to each other.

7. The battery pack case according to claim 1, wherein the support structure is formed on at least one side of each of outer peripheries of the first case and the second case at which the first case and the second case are coupled to each other.

8. The battery pack case according to claim 1, wherein the support structure is formed on entireties of outer peripheries of the first case and the second case at which the first case and the second case are coupled to each other.

* * * * *